UNITED STATES PATENT OFFICE.

CARL SCHEIBLER, OF BERLIN, GERMANY.

PROCESS OF OBTAINING SUGAR FROM THE JUICES OF PLANTS.

SPECIFICATION forming part of Letters Patent No. 260,328, dated June 27, 1882.

Application filed March 22, 1882. (No specimens.) Patented in England January 26, 1882, No. 398; in France February 24, 1882, and in Belgium March 4, 1882, No. 57,238.

*To all whom it may concern:*

Be it known that I, CARL SCHEIBLER, doctor of philosophy, subject of the King of Prussia, residing at Berlin, Prussia, German Empire, have invented certain new and useful Improvements in the Process of Obtaining Sugar out of the Juices of Plants; and I do hereby declare the following to be a full, clear, and exact description of the invention, such as will enable others skilled in the art to which it appertains to make and use the same.

The strontium saccharate obtained by boiling molasses, sirup, or other saccharine juices or solutions with caustic strontium has heretofore been deposited into rather long, square, and flat boxes and sprinkled with water or a solution of strontium and allowed to cool.

In my *Neue Zeitschrift fur Rübenzucker-Industrie*, vol. 8, page 5, paragraphs 3 and 4, I have fully described the method of proceeding, which has for its object to recover a part of the strontium from the saccharate in the form of crystallized strontium, $Sr(OH)_2 + 8H_2O$, for the purpose of utilizing it in the precipitation of sugar from molasses. The method heretofore resorted to has, however, many practical disadvantages, the principal of which are the following: first, that a sensible portion of the crystallized strontium is lost in its separation from the strontium saccharate during the process of washing on a sieve, and also by ejection when subsequently treated in the usual centrifugal machines; second, that large quantities of water are required for the washing, which unduly attenuate or thin out the saccharine juices; third, that these operations result in material losses, not only of strontium, but also of saccharine solution, by spilling, &c., and, further, that the hands of the workmen are deleteriously affected by the causticity of the saccharine lyes, and that these operations are the most uncleanly and disagreeable of the whole process of manufacture.

The object of this invention is to remedy these disadvantages, and that by the following new method of operation:

The saccharate obtained by boiling saccharine juices with strontium or strontium saccharate is allowed to cool in compact masses without the addition of water, and subjected to a systematic lixiviation after cooling. The strontium saccharate, as obtained from molasses after purification by means of a strontium solution, is of the following average composition:

| | |
|---|---|
| Oxide of strontium | 18 @ 19% |
| Sugar | 27 @ 28 " |
| Water, free and combined | 55 @ 53 " |
| | 100   100 |

The quantity of water in the saccharate is more than sufficient to produce crystallized strontium from the hydrate $Sr(OH)_2 + 8H_2O$, and it will be seen by the following conversion that the water is in excess:

| | |
|---|---|
| Hydrate of strontium $Sr(OH)_2 + 8H_2O$ | 46 @ 49% |
| Sugar | 27 @ 28 " |
| Water, in excess | 27 @ 23 " |
| | 100   100 |

This quantity of water is more than sufficient, for the reason that not all of the oxide of strontium, but only a portion of it, is converted into crystallized strontium, $Sr(OH)_2 + 8H_2O$, while the other portion thereof forms with the sugar a soluble saccharate.

I have found the saccharate as taken from the suction-filters after cooling is composed of a mass of loose yet adhesive and compact strontium crystals, $Sr(OH)_2 + 8H_2O$, that like a sponge is saturated with a concentrated solution of fluid saccharate of strontium. Upon this fact I have based the following method of operation: The strontium saccharate is allowed to cool without any addition of water. After about twenty-four hours it is lixiviated (in an apparatus especially designed for this purpose) with cold water in a systematic manner—that is to say, in such manner that the lixiviating-fluid is passed to that vessel or part of the apparatus in which the lixiviation has progressed the most, while the resulting solution is transmitted from the latter to a series of other vessels or parts of the apparatus successively until it reaches the last vessel, that has just been filled with the freshly-cooled saccharate, from which the solution is drawn in a concentrated state. In carrying out this process of lixiviation, based on the principle of counter-currents, any suitable apparatus may be employed—such, for example, as those arranged in battery and used in the ordinary processes of maceration, diffusion, elutriation, &c. The saccharate to be lixiviated is placed in lumps into the vessels or packed into boxes provided with perforated bottoms, which are then set into the vessels; or the saccharate may be formed into bricks or blocks while yet warm and plastic, which are then lixiviated. The cooled saccharate may, however, also be decomposed into crystals, $Sr(OH)_2+8H_2O$, on the one hand and into soluble saccharate on the other by means of centrifugal machines. By whichever of the described methods the lixiviation of the previously-cooled saccharate is effected, a solution is obtained that contains two-thirds molecules of strontium to each molecule of sugar, and a residue in the form of pieces, blocks, &c., containing one and one-third molecule of the original oxide of strontium in the form of crystals, $Sr(OH)_2 8H_2O$.

When the fluid saccharate solution is too concentrated a separation of monosaccharate of strontium $(C_{12}H_{22}O_{11}+S_2O+XH_2O)$ in the form of white masses frequently takes place. This formation of monosaccharate of strontium should be avoided, and it does not take place during the uninterrupted and regular process of lixiviation, but only when from some cause or other the lixiviating-battery is left inoperative for any length of time. Even this formation of monosaccharate of strontium during an interruption of the process of lixiviation is avoided in drawing the concentrated solution from the vessels in which it exists and in adding thereto as quickly as possible less concentrated solution or water. In case the formation of monosaccharate of strontium has already taken place it is again dissolved by the proceeding further with the process of lixiviation.

The advantages resulting from my improved method of decomposing the strontium saccharates are as follows:

First, I obtain the sugar from the saccharate in the form of a concentrated solution that contains but a small percentage of strontium and requires but slight evaporation after saturation.

Second, I recover a maximum of strontium in the form of crystals for further use in the precipitation of sugar from saccharine solution or molasses or sirup.

Third, cleanliness of the process of lixiviation and no losses of sugar or strontium through the mechanical agents employed.

Fourth, greater facilities in carrying out the process and a comparatively-large saving in labor and expense.

Having now described my invention, what I claim is—

1. The process of decomposing the hot precipitate of strontium saccharate after cooling, which consists in the systematic lixiviation with water or cold saturated strontium solution by allowing the latter to become gradually concentrated in its passage from the most lixiviated saccharate to the least lixiviated saccharate in a battery of vessels containing such saccharate, as set forth.

2. In the method of decomposing the strontium saccharates, forming the same into bricks or blocks while yet warm and plastic, allowing the bricks or blocks so formed to cool before lixiviating the same, as described.

In testimony whereof I affix my signature in presence of two witnesses.

CARL SCHEIBLER.

Witnesses:
GEORGE LOUBIER,
B. ROI.